United States Patent [19]

Koehler

[11] Patent Number: 5,142,414
[45] Date of Patent: Aug. 25, 1992

[54] ELECTRICALLY ACTUATABLE TEMPORAL TRISTIMULUS-COLOR DEVICE

[76] Inventor: Dale R. Koehler, 1332 Wagontrain Dr., Albuquerque, N. Mex. 87123

[21] Appl. No.: 688,891

[22] Filed: Apr. 22, 1991

[51] Int. Cl.$^5$ .............................................. G01B 9/02
[52] U.S. Cl. ................................... 359/578; 356/352; 359/579
[58] Field of Search ................. 359/577, 578, 579, 68, 359/71; 356/352, 405, 406

[56] References Cited

U.S. PATENT DOCUMENTS

| | | | |
|---|---|---|---|
| 2,534,846 | 12/1950 | Ambrose et al. | 359/577 |
| 2,804,803 | 9/1957 | Edwards et al. | 359/578 |
| 3,471,217 | 10/1969 | Wright | 356/352 |
| 3,612,655 | 10/1971 | Buchan et al. | 356/352 |
| 3,841,734 | 10/1974 | Kermode | 359/578 |
| 3,902,012 | 8/1975 | Dalton et al. | 356/352 |
| 4,222,635 | 9/1980 | Julke | 356/352 |
| 4,453,804 | 6/1984 | Evans | 359/578 |
| 4,825,262 | 4/1989 | Mallinson | 356/352 |
| 4,859,060 | 8/1989 | Katagiri et al. | 356/352 |
| 4,973,131 | 11/1990 | Carnes | 356/352 |
| 5,062,689 | 11/1991 | Koehler | 359/227 |

Primary Examiner—Bruce Y. Arnold
Assistant Examiner—Martin Lerner

[57] ABSTRACT

The electrically actuated light filter operates in a cyclical temporal mode to effect a tristimulus-color light analyzer. Construction is based on a Fabry-Perot interferometer comprised of a high-speed movable mirror pair and cyclically powered electrical actuators. When combined with a single vidicon tube or a monochrome solid state image sensor, a temporally operated tristimulus-color video camera is effected. A color-generated is accomplished when constructed with a companion light source and is a flicker-free colored-light source for transmission type display systems. Advantages of low cost and small physical size result from photolithographic batch-processing manufacturability.

11 Claims, 8 Drawing Sheets

ELECTRICALLY ACTUATABLE TEMPORAL TRISTIMULUS-COLOR DEVICE

BACKGROUND OF THE INVENTION

The present invention relates to electrically actuatable light filters for temporally modulating incident light to produce colored images dependent upon the applied controlling electrical signals. The invention is based on the Fabry-Perot interferometer conceived in 1899. This interferometric concept utilizes the optical interference effects generated between two mirrored surfaces positioned in planar proximity to one another at distances of the order of the wavelength of light. Both constructive and destructive interference conditions can be created resulting in transmission or reflection of incident light. In the intervening time period since inception, many interferometer designs have been forthcoming and in latter years piezoelectrically controlled mirror motion has allowed many new applications. Most recently, with the advent of silicon micromachining technology, an interferometer comprising a single crystal silicon substrate and electrostatic actuation has been patented by S. R. Mallinson; U.S. Pat. No. 4,825,262 entitled "Fabry-Perot Interferometer".

Color filters find widespread application in the camera industry where the most common technology employed for color video cameras is the well known vidicon tube. This well-developed scanning electron beam and light sensitive conductor technology has the disadvantage, however, of requiring three tubes for a color system and of being relatively expensive to manufacture.

A second color camera technology gaining importance, especially in smaller camera applications, is the solid state image sensor. This sensor technology requires low driving voltages and operates with a three element color filter array to produce a three-color signal. A flat planar construction makes it attractive for small physical volume applications. It has an acceptable color capability but similarly requires three sensor elements per color cell or pixel. An example of such color camera technology is represented in U.S. Pat. No. 3,971,065 entitled, "Color Imaging Array", to B. E. Bayer.

Although the production of color and color images in the photographic, display and video fields has been almost exclusively the technique of high resolution spatial combination of three-color primaries, the high speed temporal or time based addition of color primaries to produce color sensation has been recognized for many years. In fact, as early as 1926, J. Guild had published ("A Trichromatic Colorimeter Suitable for Standardization Work", Transactions Optical Society, 1926, vol. 27, page 106) the constructional details of a high-speed rotating three-color filter based colorimeter. For the human observer exposed to a rapidly changing temporal color stimulus, the visual sensation arises from a biological visual integration process occurring during the time interval of the persistence of vision. The resultantly observed color is thereby determined by the relative temporal amounts of the three primary components of the stimulus. Biologically, the three-component theory of color sensation has been attributed to the spectral sensitivities of the rod and cone structure of the human eye. The temporally based production of color constitutes an approach which is an alternative to the more widespread spatially based techniques.

SUMMARY OF THE INVENTION

It is a purpose of this invention to provide a high color fidelity, electrically actuated, temporally operated tristimulus-color analyzer. Advantages of low cost and small physical size result from photolithographic batch-processing manufacturability. It is also a purpose of the invention to provide an electrically controllable three-color filter array to effect color generation through temporal modulation of incident light from a companion light source. The electrically controllable three-color filter array is constructed of a Fabry-Perot interferometer means consisting of a high speed movable mirror pair, electrical actuators and a transparent substrate plate. A colored display system results when the generator is combined with a transmissive type display element.

It is a further purpose of the present invention when combined with a single vidicon picture tube or a monochrome solid state image sensor to provide a temporally operated, tristimulus-color video camera.

It is an additional purpose of the invention, when combined with a conventional color-film camera to provide a color-compensated camera system.

DESCRIPTION OF THE ILLUSTRATED EMBODIMENTS

Figure 1:
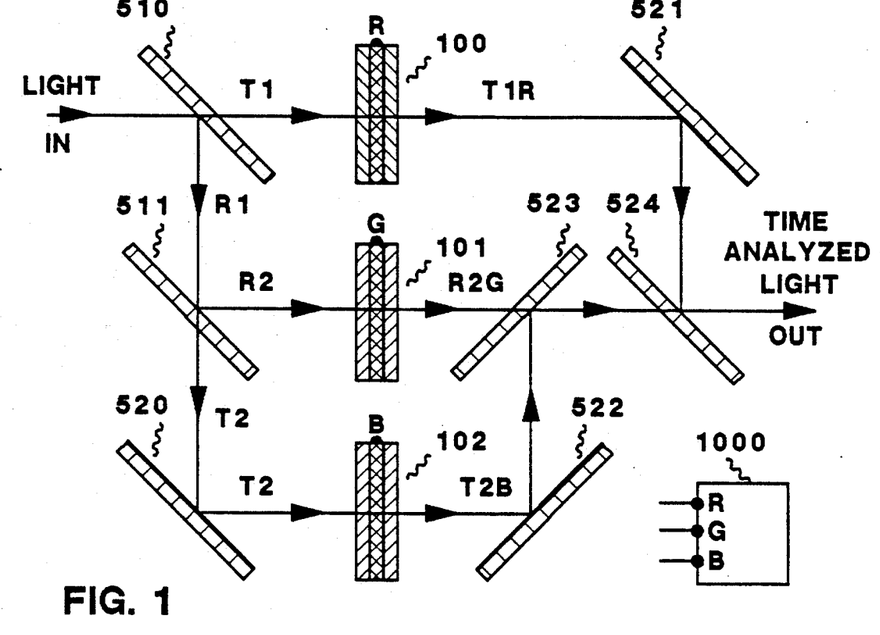
FIG. 1 is a schematic view showing a color-analyzer system according to the present invention.

FIG. 1 illustrates a color-analyzer system. The system comprises an electrically actuatable light filter triad 100, 101 and 102, alternatively referred to in this application as color-analyzer cells, beam splitters 510 and 511 and mirror elements 520, 521, 522, 523 and 524. Incoming light is incident upon the first beam splitter 510 which separates the light beam into transmitted component T1 and reflected component R1. The reflected component R1 is passed onto a second beam splitter 511 to produce reflected component R2 and transmitted component T2. The transmitted component T2 is further redirected by mirror element 520 onto blue filter element 102 while the reflected component R2 is directed onto the green filter element 101. First transmitted component T1 is incident on the red filter element 100. The filter elements 100, 101, and 102 are Fabry-Perot interferometers whose mirror planes are movable relative to one another along their normal axis by electrical actuation. Mirror plane motion results in two physical and optical positions of the interferometer filter. Constructive interference in the ON state allows optical transmission through the interferometer at a wavelength which is a submultiple of twice the physical gap spacing of the two mirror planes while destructive interference in the OFF state disallows optical transmission by not satisfying the wavelength/gap ratio requirement of constructive interference. Filter element 100 in the ON state passes red light and in the OFF state reflects all visible wavelengths. Similarly, filter elements 101 and 102 pass green light and blue light, respectively, in the ON state and reflect all visible wavelengths in the OFF state.

The filter elements are actuated by a high-speed cyclically-operated triple-output electrical source 1000 with control outputs R, G and B to filter elements 100, 101 and 102 respectively. The cyclical output of the source 1000 applies actuation ON signals on a temporal basis to each of the filter elements 100, 101 and 102 in rapid cyclical succession at rates faster than the persistence of vision, typically faster than 1/30 second. The output light components T1R, R2G and T2B, transmitted through the filter elements 100, 101, and 102 during the ON states, are directed through the mirror systems 520 and 524 for the red light, 523 and 524 for the green light and 522, 523 and 524 for the blue light. The partial mirrors 523 and 524 allow both transmission and reflection as shown in FIG. 1. Transmitted light at the output, therefore, consists of a time series of light pulses; red, green and blue pulses in rapid succession, each color component pulse being a measure of the respective color component amounts present in the incoming light. If, for example, only red light is present at the input, only the output T1R will be non-zero and the light pulse time series will consist only of the red component pulses.

To effect a comprehensive analysis of most colors in a three-primary color based system, the international tristimulus system, the 1931 International Commission on Illumination (CIE), has been adopted. In this tristimulus system, every color is described as consisting of three primary components, the relative amounts of which are determined by an integral spectral convolution of the given color with three internationally accepted color-standard distribution functions, red, green, and blue. The green color-standard distribution function is chosen to be the spectral response function of the human eye. Insofar as color-filter transmission functions can be made to accurately approximate the color-standard distribution functions, accurate analysis or reproduction of wide spectrally ranging colors is possible. In the Fabry-Perot interferometer, the filter transmission function is the well-known Airy function. The spectral shape of this function is governed by the reflectances of the mirrors of the interferometer and therefore, the Fabry-Perot filter transmission function is controllable during manufacture by controlling the reflectance quality of the mirrors. In this way, the Fabry-Perot filter transmission functions can be made to approximate the color-standard distribution functions. Furthermore, a second design variable is afforded by utilizing multiple Fabry-Perot filters in optical tandem wherein the overall filter transmission function is a product of the Airy transmission functions of the individual filters; the light, in physical succession, passes through each of the multiple filter elements.

Since the spectral widths, that is, the full width at half of the maximum transmission amplitude, of the tristimulus color-standard distribution functions for red, green and blue light are approximately 14 percent 20 percent and 12 percent respectively, the Fabry-Perot interferometers must be fabricated with mirror-gap spacings at the first or second order of interference to achieve transmission functions that approximate the color-standard distribution functions. In other words, the interferometer gap spacing for constructive interference of the red filter, for example, needs to be one-half of the red peak-wavelength, that is one-half of 595 nanometers. Larger gap spacings will result in narrower spectral widths, constructive multiple-order interference mixing of different optical wavelengths and an inability to approximate the color-standard distribution functions.

Figure 2:
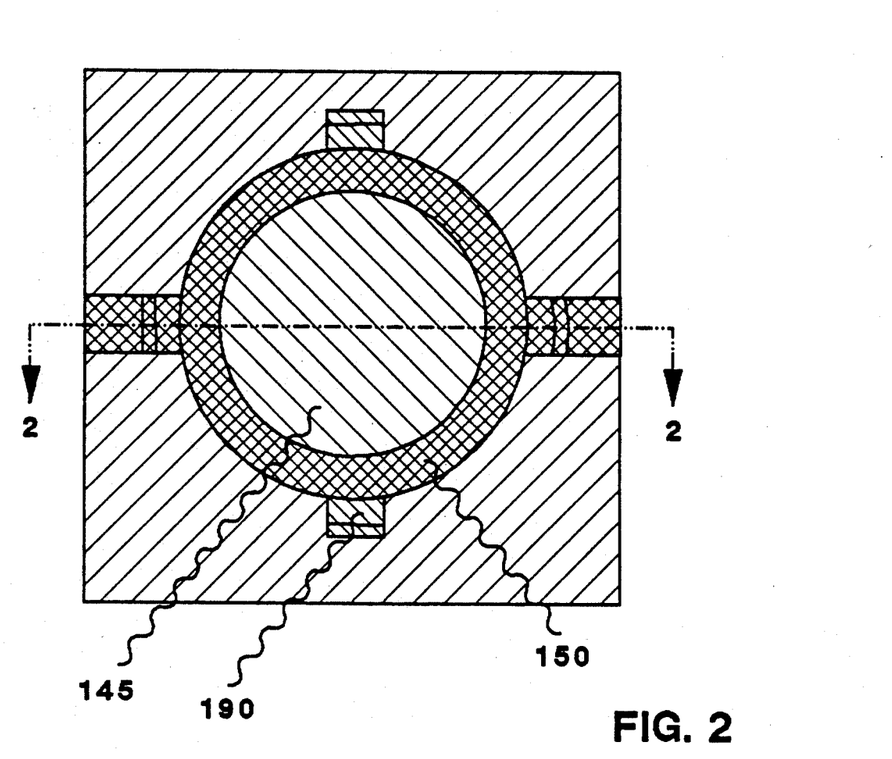
FIG. 2 is an enlarged plane view of the Fabry-Perot color-analyzer cell structure.
Figure 3:
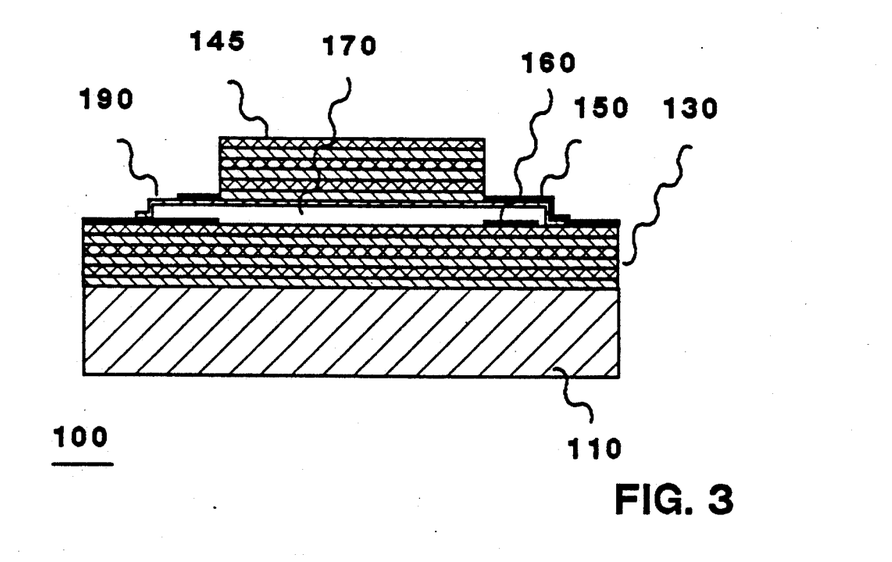
FIG. 3 is a sectional view along line 2—2 of FIG. 2 of the Fabry-Perot color-analyzer cell.

FIGS. 2 and 3 illustrate a plane view and a sectional view through section 2—2 of FIG. 2 of an electrostatically actuated Fabry-Perot interferometer filter element or color-analyzer cell 100. The color-analyzer cell is composed of a transparent substrate 110 with a multilayer dielectric mirror element 130 deposited on the substrate. Alternatively, a metallic mirror can be used. Electrically conducting electrodes 160 are positioned on the mirror 130. A second mirror element 145 is fashioned on a supporting diaphragm 190 to create the gap 170 which constitutes the Fabry-Perot cavity. The second conducting electrode elements 150 are deposited on the diaphragm 190 in opposing position to the bottom electrodes 160. The temporal control voltages from source 1000 shown in FIG. 1 are applied to the set of electrode pairs 160 and 150 and create an electrostatic force of attraction between the diaphragm supported mirror element 145 and the substrate mirror 130. The mirror element 145 moves under this attractive force to a new gap position thereby changing the state of the color-analyzer cell from reflection to transmission or vice versa. Transmission takes place when the gap distance 170 is an integral number of spectral half-wavelengths, either red, green or blue.

Although this electrostatically actuated motion of the mirror element 145 is conventionally designed to provide position dependent action, that is, positioning of the mirror element 145 to form a Fabry-Perot gap distance which is directly proportional to the actuation voltage and inversely proportional to the diaphragm 190 spring constant, an alternative embodiment utilizes a mechanical stop or mechanical restrictor to physically limit the motion. It can be shown that if the ratio of the electrostatic force strength to mechanical force strength is greater than the approximate value 4/27, then physical collapse of the two electrodes ensues, that is, the attractive electrostatic force overwhelms the mechanical spring force and the motion of the mirror 145 proceeds to try to reduce the gap 170 to zero. A first two-position version of this concept is the color-analyzer cell 100 of FIGS. 2 and 3 where the applied control voltage satisfies or exceeds the collapse criterion. With the unactuated or relaxed gap state 170 of the color-analyzer 100 designed for transmission, the collapsed state with the two mirrors in proximate contact will produce reflection and the color-analyzer is equivalent to a two-position light switch.

Figure 4:
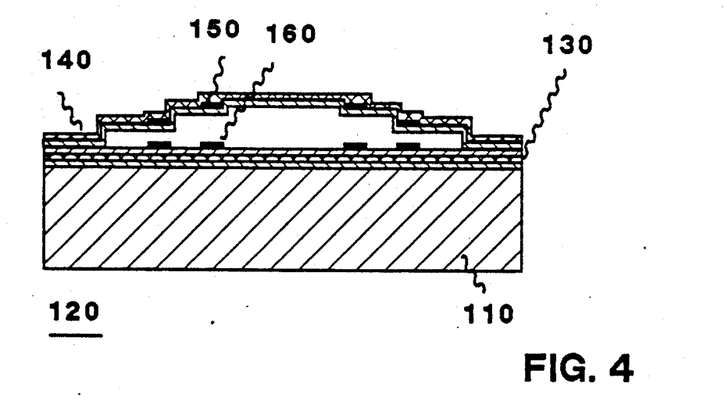
FIG. 4 is a sectional view of a single element tristimulus color-analyzer with mechanical constraints.
Figure 5A:
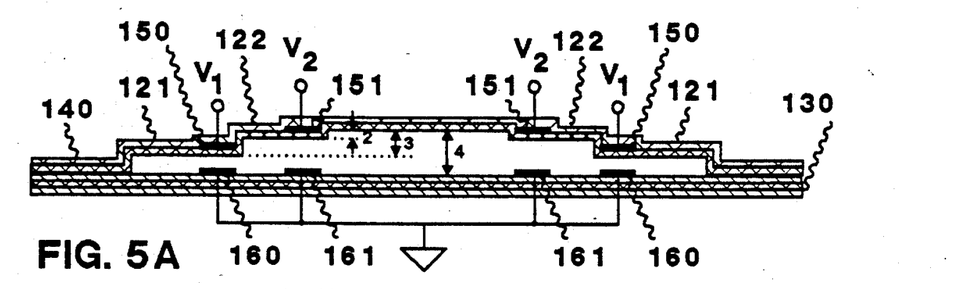
FIGS. 5A and 5B show the gap structure in the Fabry-Perot color-analyzer cell and the associated electrode activation timing diagram.

A second three-position version of this concept is the single-element color-analyzer construction 120 depicted in FIG. 4. Opposed to the substrate mirror 130 is an integral mirror-diaphragm 140. The mirror-diaphragm is under tension and exhibits a restoring force to deflections normal to the diaphragm plane. Electrode elements 160 and 161 are placed on the substrate mirror 130 and electrode elements 150 and 151 are placed on the stepped-construction mirror-diaphragm element 140. By this construction, as illustrated in FIG. 5A, voltages V1, applied to the top electrodes 150 on the first step 121 of mirror-diaphragm 140, will force the mirror-diaphragm to deflect or close to the mechanically restricted gap position 3 in response to the attractive electrostatic force on the mirror electrodes 160 and 150. At this gap position, green light will be transmitted through the color-analyzer. With voltage V2 additionally applied to the second set of electrodes 151 and 161 on the second step 122 of mirror-diaphragm 140, the mirror-diaphragm will close to the mechanically restricted gap position 2. At this gap position, blue light will be transmitted through the color-analyzer. Under the no-voltage condition, that is V1 and V2 equal to zero, the relaxed gap position is 4 where red light is transmitted through the color-analyzer. The time sequence application of the voltages V1 and V2 to their electrode pairs, as shown in the timing diagram of FIG. 5B, cycles the single element color-analyzer through the three red, green and blue transmission positions in 1/30 second. This three-position single element color-analyzer construction constitutes a preferred embodiment of the invention.

Figure 5B:
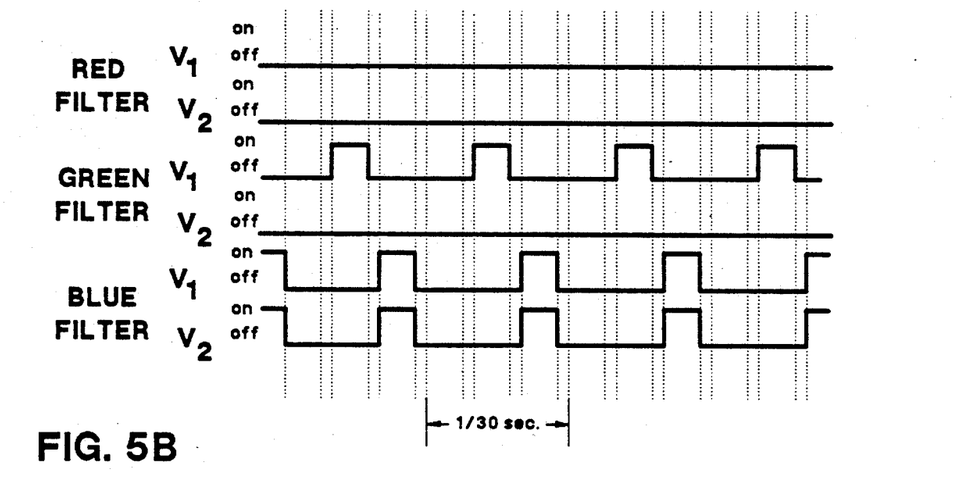

Although not shown in the timing diagram of FIG. 5B, adjustment or enhancement of the magnitudes of the three transmitted color components relative to one another is achievable by adjustment of the individual color-component cycle-time fractions via timing controls in the electrical source 1000.

Additionally, the three-color system described thus far could be readily expanded to include additional color primaries thereby including in the color analysis, or reproduction, colors outside of the range of the tristimulus system.

Figure 6:
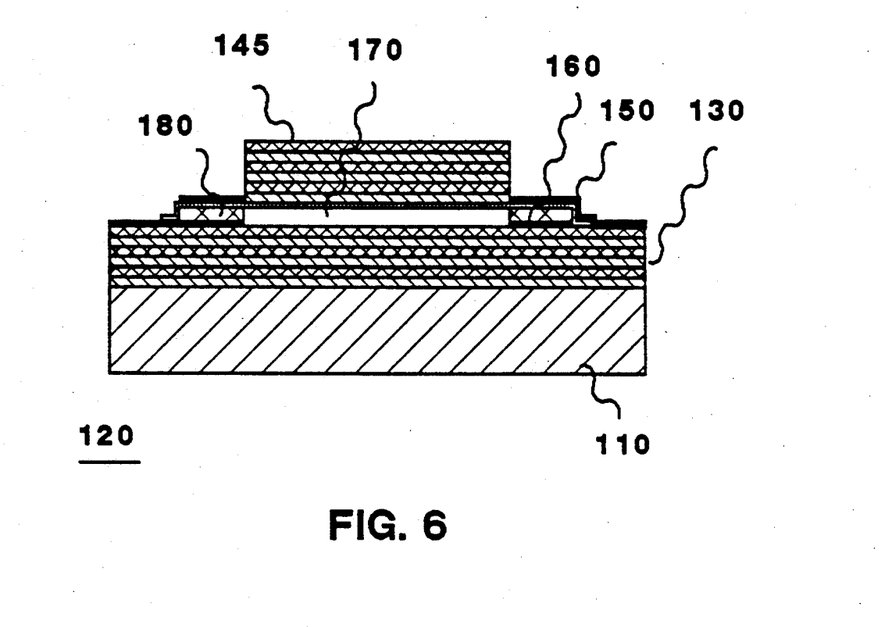
FIG. 6 is a sectional view of an alternative embodiment of the Fabry-Perot color-analyzer cell incorporating a piezoelectric actuator.

Depicted in FIG. 6 is another alternative embodiment of the color-analyzer element 120. Transparent substrate 110 is coated with mirror 130 and a second mirror 145 is provided to form cavity gap 170. Electrode pairs 160 and 150 are opposed over the intervening piezoelectric expander element 180. Upon application of voltage differentials to the electrode pairs 160 and 150, a mechanical strain is produced in piezoelectric expander element 180 thereby causing the expander element to expand or contract in direct relation to the polarity and magnitude of the applied voltage. Mechanical motion of the second mirror 145 ensues and the resulting gap dimension 170 will be thereby electrically modified and can be positioned to pass either red, green or blue light through the color-analyzer. Rapid time cycled application of the associated R, G and B electrical control signals will again allow analysis of all colors. Piezoelectric material strain coefficients can be as large as 0.5 nm/Volt but in general the color-analyzer when configured in a piezoelectric expander embodiment will require higher operating voltages than in the electrostatically actuated analyzer.

Figure 7:
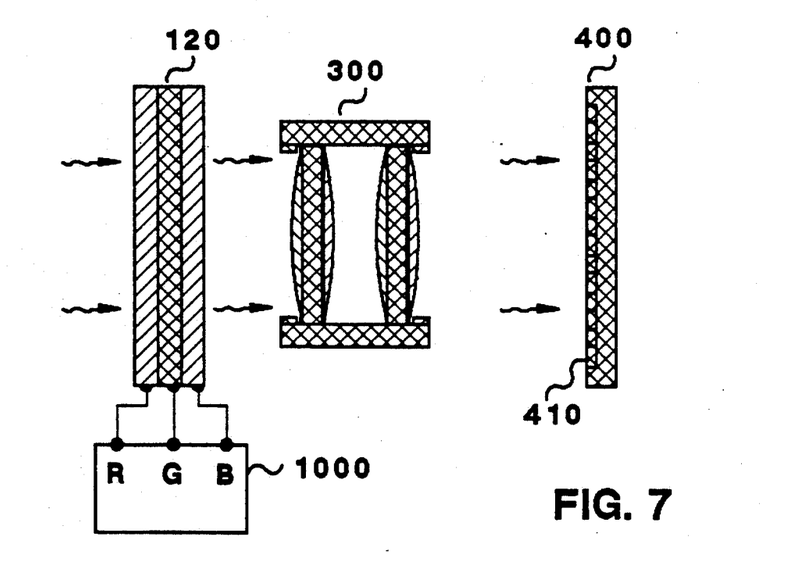
FIG. 7 is a schematic view of a color-analyzer camera system according to the present invention.

FIG. 7 illustrates a schematic view of a color-analyzer camera system. The color-analyzer 120 and associated cyclically-operated electrical source 1000 is configured with a camera lens system 300 and image generator 400. For a video camera, the image generator 400 is a vidicon tube with pixels 410 or a solid state image sensor with photodetectors 410. For a conventional film camera, the image generator 400 is a color-sensitive film with color-sensitive film dye grains 410.

Color image production for the conventional film camera system application requires at least one complete time cycle through the red, green and blue filter states of the color-analyzer 120 which thereby exposes each of the three-color primary sensitive film dye grains to its own color image. Complete color image production is seen to require three times the temporal exposure of the conventional film camera but individual control of the color components in the color-analyzer is achieved through electrical control of the color-component cycle-time fraction and film color-compensation is thereby accomplished.

Figure 8:
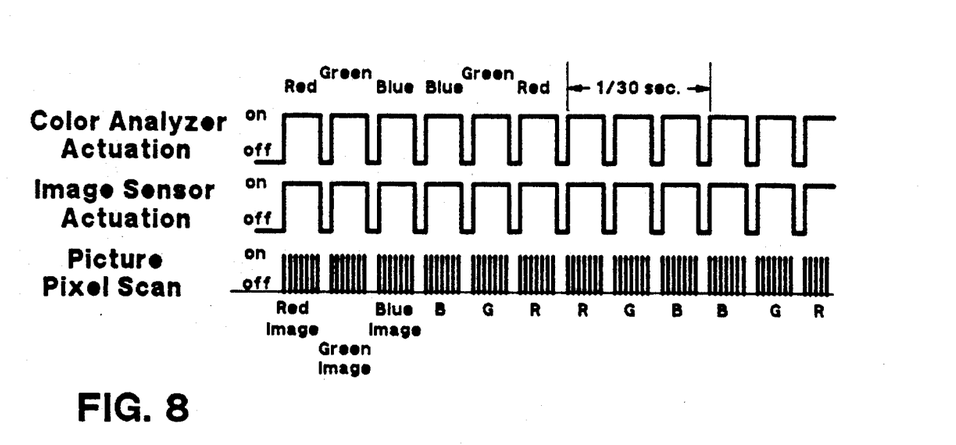
FIG. 8 shows the image sensor actuation timing diagram with the associated video pixel scan signals in the color-analyzer video camera system.

For the color-analyzer video camera application, as for the conventional film camera application, each multi-pixel video picture frame is composed of three temporally separate time-sequenced primary color images, a red image, an green image and a blue image. Whereas the conventional spatially-composite-color video frame rate is 1/30 second, the temporal color-analyzer color-image rate is 1/90 second to achieve the same 1/30 second frame rate. Color-analyzer video pixel scan rates are likewise required to be three times faster than for conventional pixel scan rates. FIG. 8 depicts the timing diagram for a solid state image sensor time-sequenced color video camera system. The color-analyzer is shown being sequentially cycled through the three color-filter states in alternating reverse order, that is, red, green, and blue following by blue, green and red.

Figure 9:
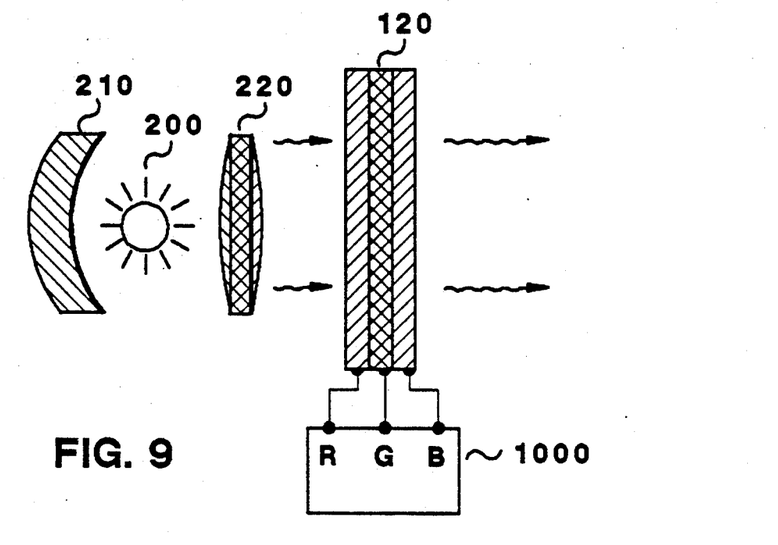
FIG. 9 is a schematic view of the color-generator according to the present invention.

Colored light generation, as opposed to colored light analysis, is accomplished in a straightforward manner by the simple addition of a collimated wideband spectral light source as shown in the schematic of FIG. 9. Color-analyzer 120 in conjunction with its associated cyclically-operated electrical source 1000 is constructured with light source 200, concentrating element 210 and collimating element 220. As mentioned above, incorporated in the electrical source 1000 are time-cycle-fraction controls which allow variation of the fractional on-time of each of the color-states, red, green, or blue, of the color-analyzer. The collimated light output from element 220 impinges on color-analyzer 120 to generate a colored transmission at the output of the analyzer 120 that is dependent upon the relative amounts of red, green and blue filtered light components set by the timing cycle controls of the cyclical source 1000.

Figure 10:
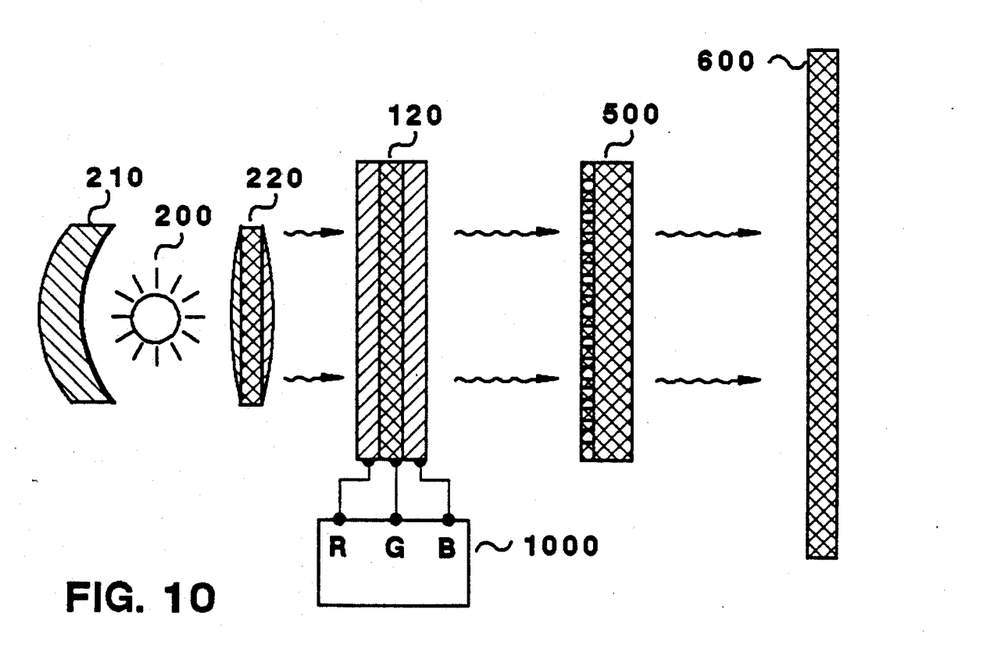
FIG. 10 shows a schematic of a color-generator based transmissive display system.

FIG. 10 illustrates schematically the combination of the color-generator with a transmissive display element 500, such as film, or a transmissive liquid crystal display or the display technology disclosed in FIGS. 1 and 5 of U.S. Pat. No. 5,062,689 titled, "Electrostatically Actuatable Light Modulating Device". In operation, light of each of the temporal primary colors produced by the color-generator is incident upon an associated temporal color image produced in the transmissive display 500. Rapid time-cycling through the color-generator's tristimulus colors, in time coordination with image production in the display, produces a colored flicker-free image at the output of display element 500 which is transmitted to screen element 600 for viewing.

Figure 11:
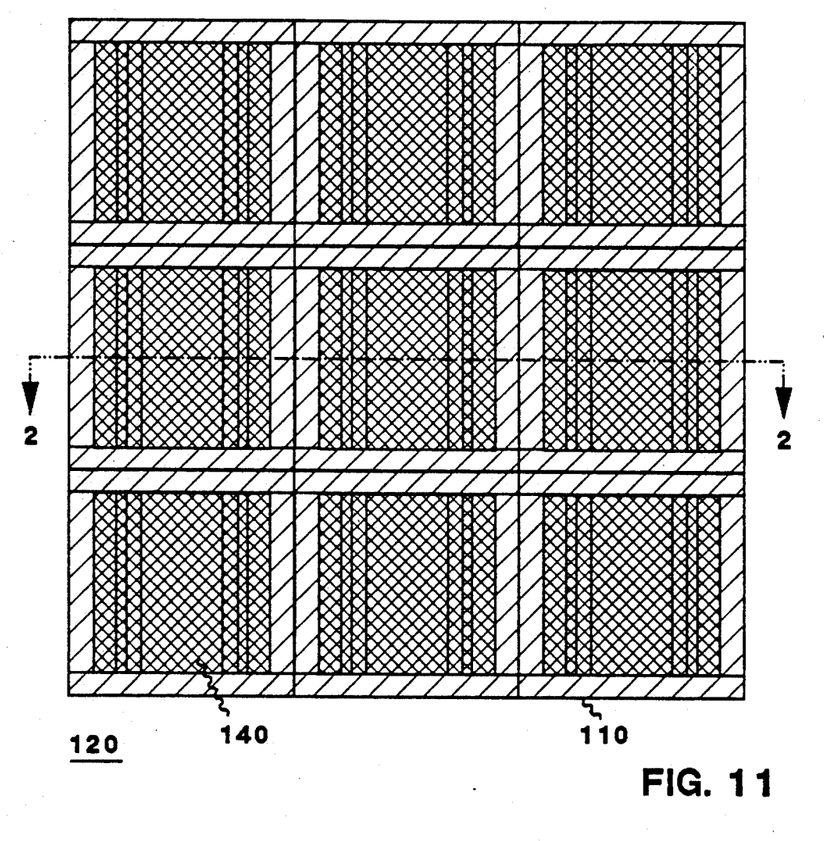
FIG. 11 is an enlarged plane view of an array structure of color-analyzer cells.
Figure 12:
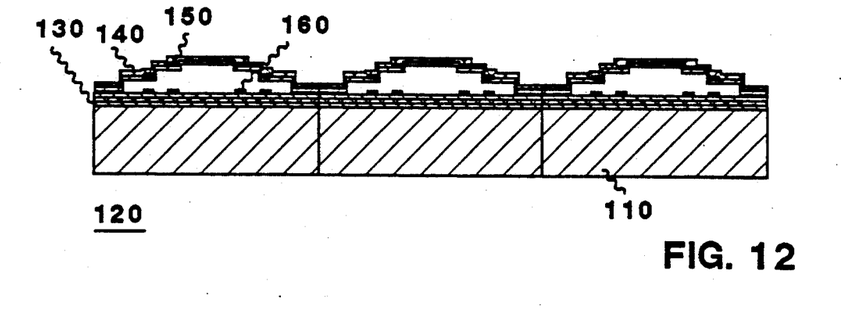
FIG. 12 is a sectional view along line 2—2 of FIG. 11 of the color-analyzer cell array.

An array of color-analyzer elements 120 is depicted in plane view in FIG. 11 and in sectional view in FIG. 12. Such a two-dimensional planar arrangement of color-analyzer elements allows for analysis of increased areas of light environments, or in miniaturized form, allows for a high spatial resolution matrix array. Additionally, when the color-analyzer is fabricated in photolithographic-based processing technologies, these arrays are readily manufactured on single element substrates.

Although Fabry-Perot interferometer mirror elements can be constructed with well-established optical polishing and coating procedures, on separate mirror substrates, latter-day thin-film deposition and mask-patterning technology is also applicable to the manufacturing of the color-analyzer elements. Furthermore, if arrays of miniature elements are constructed, photolithographic processing can be used. Manufacturing steps, for the electrostatically actuated color-analyzer 120 of FIG. 4, using thin-film coating techniques are illustrated in FIGS. 13-17.

Figure 13:
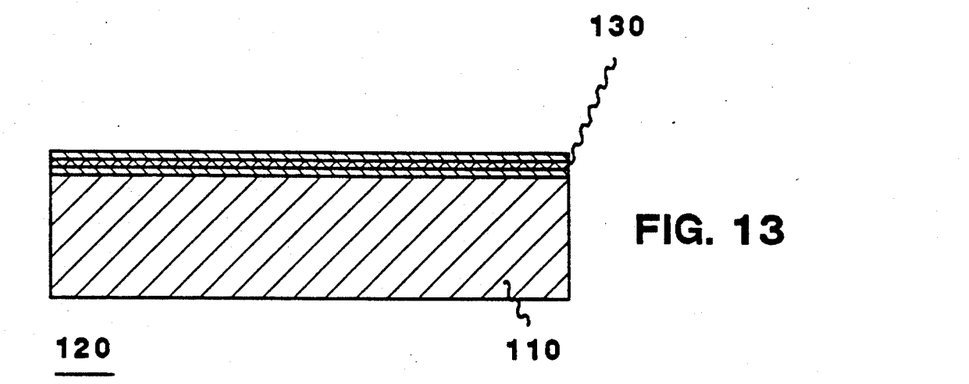
FIGS. 13, 14, 15, 16 and 17 illustrate steps in the manufacture of the color-analyzer cell.

Mirror element 130, either a multi-layer dielectric or a semi-transparent metal film such as aluminum, chromium, platinum, silver or gold, is first deposited on transparent substrate 110 as shown in FIG. 13.

Figure 14:
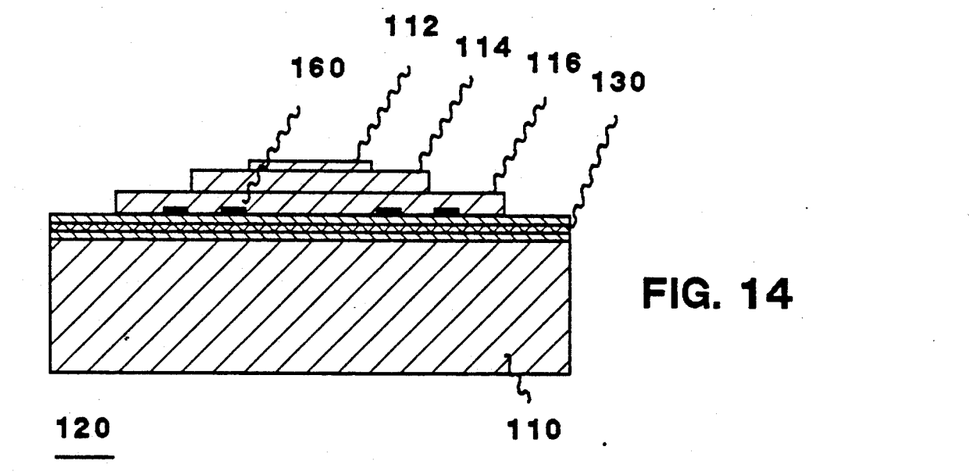

A conducting layer is then applied and patterned to form electrodes 160. This step is followed by the deposition and patterning of three sacrificial layers 116, 114 and 112 which are typically glass compounds. These steps are illustrated in FIG. 14.

Figure 15:
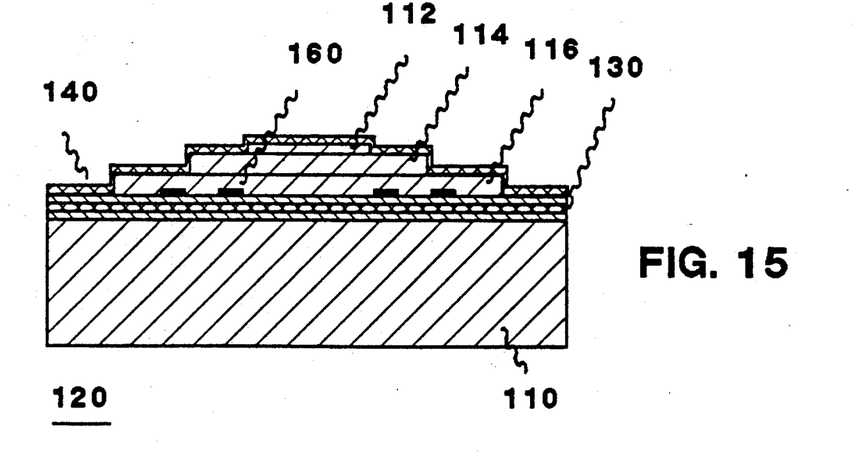

In the case of a dielectric mirror construction, the mirror layers adjacent to the sacrificial layers 112, 114 and 116 are selected to be chemically insensitive to the final sacrificial glass dissolution etchant. This chemical-etchant insensitive first layer of the multi-layer mirror stack 140 is therefore deposited over the sacrificial layers as shown in FIG. 15.

Figure 16:
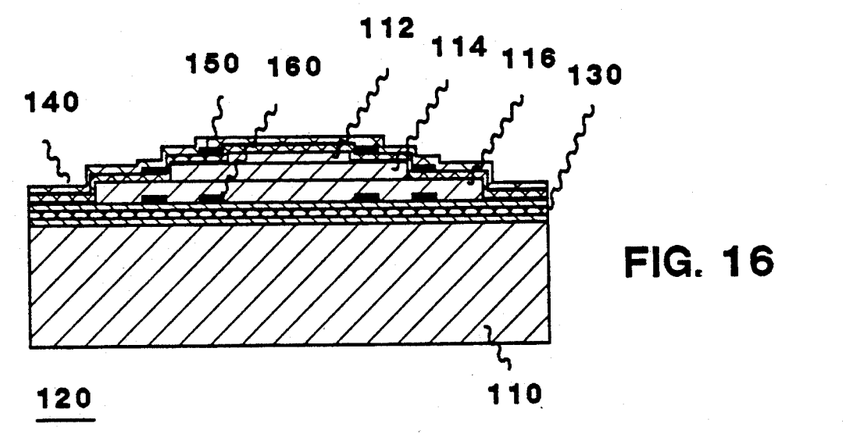

A second conducting layer is then applied and patterned to form top electrodes 150. The final layers of the multi-layer mirror stack 140 are then deposited as illustrated in FIG. 16.

Figure 17:
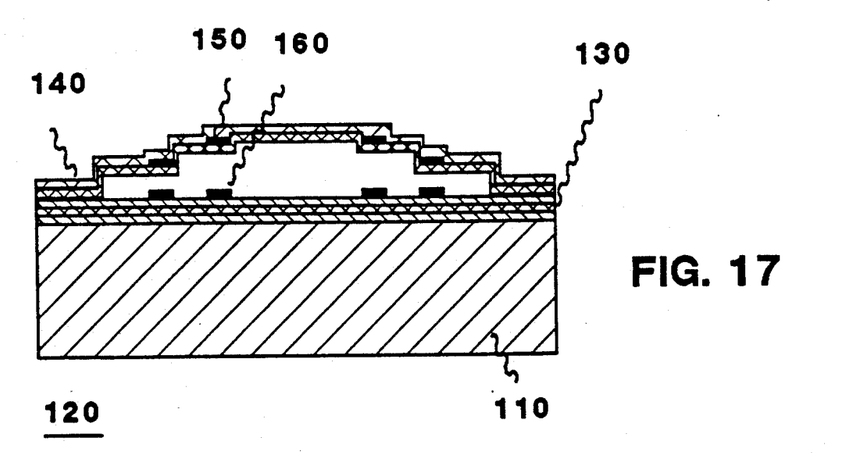

FIG. 17 shows the color-analyzer after the final manufacturing step, a glass dissolution processing step, which removes the sacrificial glass layers 112, 114 and 116 leaving the free-standing top mirror element 140 and top electrodes 150.

I claim:

1. An electrically actuatable Fabry-Perot interferometer color filter comprising:
    a mirror-coated transparent substrate;
    a mirror-coated diaphragm;
    a mechanical multi-gap-position diaphragm-constraining means; and,
    an electrostatic actuator consisting of electrode sets, oppositely positioned on diaphragm and substrate, and a voltage source acting with sufficient magnitude to effect mechanical collapse of the diaphragm into proximate contact with said constraining means.

2. The color filter of claim 1 wherein the mechanical multi-gap-position diaphragm-constraining means consists of mechanical stops.

3. The color filter of claim 1 wherein the mechanical multi-gap-position diaphragm-constraining means and the mirror-coated diaphragm consist of a single-element stepped-construction diaphragm formed integrally with the transparent substrate.

4. A temporal tristimulus-color light analyzer comprising:
    an electrically actuatable Fabry-Perot interferometer color filter further comprising:
        a mirror-coated transparent substrate;
        a mirror-coated diaphragm;
        a mechanical multi-gap-position diaphragm-constraining means; and
        an electrostatic actuator consisting of electrode sets, oppositely positioned on diaphragm and substrate, and a voltage source acting with sufficient magnitude to effect mechanical collapse of the diaphragm into proximate contact with said constraining means; and,
    a high-speed cyclically-operated electrical control source to actuate the Fabry-Perot interferometer means at the tristimulus-color transmission modes.

5. A temporal color-analyzer camera system comprising:
    a temporal tristimulus-color light analyzer comprised of:
        an electrically actuatable Fabry-Perot interferometer color filter further comprising:
            a mirror-coated transparent substrate;
            a mirror-coated diaphragm;
            a mechanical multi-gap-position diaphragm-constraining means; and
            an electrostatic actuator consisting of electrode sets, oppositely positioned on diaphragm and substrate, and a voltage source acting with sufficient magnitude to effect mechanical collapse of the diaphragm into proximate contact with said constraining means; and
        a high-speed cyclically-operated electrical control source to actuate the Fabry-Perot interferometer means at the tristimulus-color transmission modes; and,
    a camera means.

6. The temporal color-analyzer camera system according to claim 5 wherein the camera means is a conventional color-film camera system.

7. The temporal color-analyzer camera system according to claim 5 wherein the camera means is a time-sequenced color-signal video camera system.

8. A temporal tristimulus-color transmissive display system comprising:
    a temporal tristimulus-color light analyzer comprised of:
        an electrically actuatable Fabry-Perot interferometer color filter further comprising:
            a mirror-coated transparent substrate;
            a mirror-coated diaphragm;
            a mechanical multi-gap-position diaphragm-constraining means; and
            an electrostatic actuator consisting of electrode sets, oppositely positioned on diaphragm and substrate, and a voltage source acting with sufficient magnitude to effect mechanical collapse of the diaphragm into proximate contact with said constraining means; and
        a high-speed cyclically-operated electrical control source to actuate the Fabry-Perot interferometer means at the tristimulus-color transmission modes; and
    a collimated spectrally-wideband light source; and, a time-coordinated light-transmissive display means.

9. The temporal tristimulus-color display according to claim 8 wherein the light-transmissive display means is a liquid crystal display.

10. The temporal tristimulus-color display according to claim 8 wherein the light-transmissive display means is an electrostatically actuatable light modulating device.

11. The temporal tristimulus-color display according to claim 8 wherein the light-transmissive display means is photographic film.

* * * * *